United States Patent [19]

DeMenthon

[11] Patent Number: 5,388,059
[45] Date of Patent: Feb. 7, 1995

[54] COMPUTER VISION SYSTEM FOR ACCURATE MONITORING OF OBJECT POSE

[75] Inventor: Daniel F. DeMenthon, Columbia, Md.

[73] Assignee: University of Maryland, College Park, Md.

[21] Appl. No.: 998,470

[22] Filed: Dec. 30, 1992

[51] Int. Cl.$^6$ ............................................. G06F 15/62
[52] U.S. Cl. ..................................... 364/559; 364/516
[58] Field of Search ............... 364/516, 559, 460, 514, 364/550, 551.01, 561, 570; 340/700, 706, 709, 723

[56] References Cited

U.S. PATENT DOCUMENTS

| | | | |
|---|---|---|---|
| 4,565,999 | 1/1986 | King et al. | 340/825.19 X |
| 4,672,562 | 6/1987 | Egli et al. | 364/559 |
| 4,672,564 | 6/1987 | Egli et al. | 364/559 |
| 4,891,630 | 1/1990 | Friedman et al. | 340/825.19 X |
| 4,942,538 | 7/1990 | Yaun et al. | 364/559 X |
| 5,227,985 | 7/1993 | DeMenthon | 364/516 X |
| 5,297,061 | 3/1994 | Dementhon et al. | 364/559 |

*Primary Examiner*—Emanuel T. Voeltz
*Assistant Examiner*—Edward Pipala
*Attorney, Agent, or Firm*—Christopher N. Sears

[57] ABSTRACT

A sensing system for accurately monitoring the position and orientation of an object (28). At least 4 point light sources (26) are mounted on the surface of the object (28). A single electronic camera (20) captures images (92) of the point light sources (26). Locations of these images (92) are detected in each camera image, and a computer runs an iterative task using these locations to obtain accurate estimates of the pose of the object (28) in a camera coordinate system (90) at video rate. The object is held by an operator (40) for cursor (60) control, for interaction with virtual reality scenes on computer displays (22), or for remote interactive control of teleoperated mechanisms.

9 Claims, 3 Drawing Sheets

COMPUTER VISION SYSTEM FOR ACCURATE MONITORING OF OBJECT POSE

STATEMENT OF GOVERNMENT INTEREST

The U.S. Government has rights to this invention pursuant to Grant DACA76-92-C-0009.

FIELD OF THE INVENTION

This invention relates to a system for accurately monitoring the position and orientation of an object in front of an electronic camera by computer analysis of the positions of images of bright points of the object detected in the images of the camera.

BACKGROUND OF THE INVENTION

The field of computer vision includes the computer analysis of scenes projected into an electronic camera. The camera generates images of the scenes, and the computer analyzes these images and draws useful conclusions.

In particular, an active branch of computer vision is devoted to computing the position and orientation in space of an object, also called object pose, by detecting several features of the object, in a single image using a single camera, or in two images using two cameras.

Implementations using two cameras apply well-known stereometric techniques, in which the position of each feature in 3D can be obtained by triangulation from the positions of the projection of this feature in each of the two images. For more details on stereometric techniques, see the book titled "Robot Vision ", by Berthold K. P. Horn, MIT Press. This type of technique has several drawbacks. First, this system requires two cameras, which increases system cost. Second, calibrating the relative positions of the two cameras is difficult, and the system output is very sensitive to calibration errors. Third, generating the rotation matrix for an object requires lengthy trigonometric computations, and combining data from more than 3 object points requires matrix inversion computations. This results in increased hardware cost in situations where real time system response is needed.

In stereometric techniques the spatial position of each object feature is found individually, without making use of additional information such as the relative positions of the object features in space. If this information about relative positions is available, other techniques are preferable, because they can recover the pose of the object from a single image. For example, if 3 points of an object are detected in a single image and the distance between theses features in the object is known, it is possible to recover the pose of the object. However, a polynomial equation must be solved, and 2 or 4 solutions for the object pose are found. See for example "New Exact and Approximate Solutions of the Three-Point Perspective Problem ", by Daniel DeMenthon and Larry Davis, Pattern Analysis and Machine Intelligence, vol. 14, no. 11, November 1992, pp. 1100–1104. If more than 3 points are used, the solution is generally unique, but the formulas become more complicated, and would be practical only with costly hardware in real time use. See for example "An Analytical Solution for the Perspective-4-Point Problem", by Radu Horaud, Bernard Conio and Olivier Leboulleux, Computer Vision, Graphics, and Image Processing, vol. 47, pp. 33–44, 1989. One would like to choose 5 points or more to increase the reliability of the object pose results, but is faced with highly difficult mathematical computations.

An alterative approach that uses much simpler computations assumes well-known approximations to perspective projection, called orthographic projection and scaled orthographic projection. Scaled orthographic projection is an improved version of orthographic projection in which changes of scales due to the distance between the object and the camera are accounted for. For example, in U.S. Pat. No. 5,227,985, which is hereby incorporated by reference, contributed by the present inventor, a scaled orthographic projection approximation is applied. Consequently, only an approximated pose of an object is obtained from the positions of images of points of the object.

In contrast, according to this invention, the pose of the object can be obtained in a very accurate way while maintaining simplicity. This result can be obtained because the inventor has found a computationally inexpensive way to solve the exact equations characterizing a true perspective projection, thanks to an iterative approach. This approach involves performing the following simple operations:

(1) Compute correction factors accounting for the relative distances of feature points along the optical axis of the camera,
(2) Create two image vectors depending on these correction factors and on the x and y coordinates of the projections of the point features in the image,
(3) Multiply a precomputed object matrix (depending only on the relative positions of the points of the object) by the two image vectors,
(4) Normalize the two resulting vectors to obtain the first two rows of a four dimensional pose matrix;
(5) Complete the last two rows of the pose matrix using a cross-product;
(6) Go back to operation (1), unless the correction factors have not changed from one iteration loop to the next;

At the first iteration loop, the correction factors accounting for the relative distances of feature points along the optical axis of the camera may be unknown, but in most applications these correction factors are fairly small. In this case, the correction factors are taken to be initially zero. However, the number of iteration loops required to converge to an accurate pose is reduced if good initial estimates are made for the correction factors. In applications involving the tracking of a moving object, a pose of the object may have been computed at a very recent prior time, and these correction factors may be roughly estimated using this prior pose estimate. Then two or three iterations are sufficient for convergence to a very accurate object pose. Many points can be used for the object for improved reliability without any changes in the steps above.

In common with U.S. Pat. No. 5,227,985, one embodiment of this invention is a system for measuring the motions of the head of an operator. A virtual scene of virtual objects presented to the eyes of the operator in head mounted displays is modified according to these measurements. The operator may want to observe a part of the virtual scene out of his present field of view, and the system detects the rotation of his head and generates on the head mounted displays the part of the virtual scene corresponding to the new field of view. In this specific application, accurate measurements of the head motions may be required in order to provide the operator's eyes with images that precisely match what he would expect to see from his motions; the present invention will yield more accurate results than the approximate method described in U.S. Pat. No. 5,227,985.

In another embodiment of this invention, also common with U.S. Pat. No. 5,227,985, the operator may hold a specially designed "mouse" in his hand. The system computes the motions of this object by the iterative computation disclosed in this specification and displays a corresponding virtual object in the virtual scene. This virtual object may be used as a pointing cursor and more generally as a tool to interact with the other virtual objects of the scenery. The prior art for this type of application is now examined.

In U.S. Pat. No. 4,891,630 to Friedman, 1990, entitled "Computer Vision System with Improved Object Orientation Technique", a system is described using a single camera for monitoring the head motion of an operator for eyetracking purposes. A camera takes images of a patch which is attached to the cheek of the operator. The patch has 4 small flat reflective elements at its corners and a large hemispheric reflective element at its center. Reflections of a light source on these elements are detected in images taken by the camera. Reflections from the small flat elements are point-like reflections from locations which are fixed with respect to the patch, whereas reflections from the surface of the large hemispheric element may come from various locations on this surface, depending on the orientation of the patch. Therefore, when the operator moves his head, these reflections move differently in the image whether they come from the flat elements or from the hemispherical element, and formulas for head angle changes using these reflection differences are provided. However these formulations can provide only qualitative angle changes, and are valid only for very small angle changes. They may be sufficient for the specific application described in that patent, but would provide incorrect results if they were applied to tracking the large displacements of an object held in the hand of an operator, or to tracking the large rotations of the head of an operator exploring a virtual scene. In contrast, the apparatus in the present disclosure gives correct results for large displacements of an object.

An example of display cursor control by optical techniques is presented in U.S. Pat. No. 4,565,999 to King et al., 1986, entitled "Light Pencil". A device fixed to the head of the operator comprises 4 light emitting diodes (LEDs). A photodetector placed above the computer display senses the variations of intensity of the LEDs and a processor relates these variations to changes in orientation of the LEDs with respect to the photodetector. However, this system is intended for the control of horizontal displacement of a cursor on the display by the operator's vertical and horizontal rotations. It does not provide a way to detect other motions such as translations or roll, and therefore cannot be applied to the general pose monitoring of objects.

SUMMARY OF THE INVENTION

The object of this invention is to provide a system for providing an accurate monitoring of the spatial pose of an object using digitized images from a single electronic camera. In the preferred embodiment, at least four point light sources such as small bulbs or light emitting diodes are mounted in a noncoplanar arrangement on the object. The electronic camera is equipped with a light sensitive array such as a CCD array and captures images of the light sources.

In a preliminary phase, the positions of each light source $M_i$ of the object have been measured in a coordinate system of the object. The origin $M_0$ of this coordinate system is not required to be one the point light sources. A matrix A is created in which each row has 4 elements, the first three elements being the 3 coordinates of each of the light sources, U, V, W, and the last element being 1 (one). The pseudo-inverse matrix B of this matrix is computed, and is called the object matrix in this disclosure. This object matrix is computed only once for a given configuration of light sources on the object.

In the monitoring phase, the camera captures images of the light sources. The light sources project as spots on this light sensitive CCD array. The centers of these spots are found in the camera images, for example using the image processing techniques described in details in U.S. Pat. No. 5,227,985. The coordinates $x_i$ and $y_i$ of these spot centers are used in the following computation.

The goal of the computation is to obtain the translation and rotation of the object from these coordinates and from the precomputed object matrix. The approach consists of iteratively computing the well known $4 \times 4$ transformation matrix P, called pose matrix in this disclosure, which combines the rotation matrix and translation vector into a single $4 \times 4$ matrix. An iterative loop is implemented.

The first operation of the loop consists of finding "corrected" image coordinates $x'_i = x_i(1 + \epsilon_i)$, $y'_i = y_i(1 + \epsilon_i)$, where the $\epsilon_i$ terms are small correction factors obtained from the projection of the vectors $M_0M_i$ on the camera optical axis (bold characters are used to specify vectors and matrices). At the first iteration loop, the $\epsilon_i$ terms are set equal to zero, or may be estimated if some very recent information about the object pose is available. At the following iteration loops, the $\epsilon_i$ terms are computed from the object pose just computed at the previous iteration loop.

The vector $I_x$ of the corrected $x'_i$ coordinates of the image spots is called the image x-vector in this disclosure. Multiplying the image x-vector with the object matrix B defined above yields a vector with 4 coordinates, called $Q_1$ in this disclosure. The first three coordinates of $Q_1$ are the coordinates of a vector with 3 coordinates called $R_1$. The norm of $R_1$ provides the z component to the translation vector to be used in the third row of the pose matrix P. Dividing vector $Q_1$ by the norm of $R_1$ yields the first row $P_1$ of the pose matrix P. Similarly, vector $I_y$ of the $y'_i$ coordinates of the image spots is called the image y-vector in this disclosure. Multiplying the image y-vector with the object matrix B defined above yields a vector with 4 coordinates, called $Q_2$ in this disclosure. The first three coordinates of $Q_2$ are the coordinates of a vector with 3 coordinates called $R_2$. Normalizing the first three coordinates of $R_2$ again yields the z component to the translation vector to be used in the third row of the pose matrix P. Dividing vector $Q_2$ by the norm of $R_2$ yields the second row $P_2$ of the pose matrix P. In the third row of the pose matrix, the first three elements are obtained by a cross product of the two vectors obtained from the first three elements of the first and second row of the pose matrix. The fourth element of the third row is the z component of the translation matrix already computed. Finally the fourth row of the pose matrix is (0, 0, 0, 1).

The pose matrix so computed is not very accurate at the first iteration loop if the $\epsilon_i$ terms were set to 0 at the beginning of that loop. But at this point, more accurate estimates for $\epsilon_i$ can be obtained using the just computed pose matrix P. Then the computation above can be repeated with these new $\epsilon_i$ estimates. Only a few iterations are generally required for the method to converge to an accurate pose.

In a cursor control embodiment of this invention, the object is held by the operator, and the poses in space of this object are computed with high frequency. A virtual cursor of known 3D structure is considered to be rigidly linked to the object and therefore move along with the object. In other words the translation vector and rotation matrix of the virtual 3D cursor is taken to be equal to those computed by the system for the object. Then the perspective view of the 3D cursor on the computer displays is obtained by the same perspective projection that is used for the other 3D objects of the virtual 3D scene represented on the displays.

In a teleoperation embodiment, servomechanisms translate the computed motions of the operator into the motion of the teleoperated system.

The system according to this invention is fast enough so that the pose of the object can be precisely obtained every time the camera transmits a new image field through its video signal, typically every 1/60 second for most cameras, using only inexpensive hardware.

OBJECTS AND ADVANTAGES OF THE INVENTION

Accordingly, several objects and advantages of the present invention are:
(a) To provide a system for accurately computing the pose of an object using images of light sources mounted on the object obtained by an electronic camera
(b) To provide a system providing the pose of an object in a few iteration steps involving at each step the multiplication of a precomputed object matrix by two vectors and the normalization of the results;
(c) To provide a system in which large motions of an operator are accurately monitored by a single camera to let the operator interactively modify views of a virtual scene or interact with virtual objects displayed on this scene;
(d) To provide a system in which large motions of an operator are accurately monitored by a single camera to let the operator remotely control a teleoperated device.

Still further advantages will become apparent from a consideration of the ensuing description and drawings.

Figure 2:
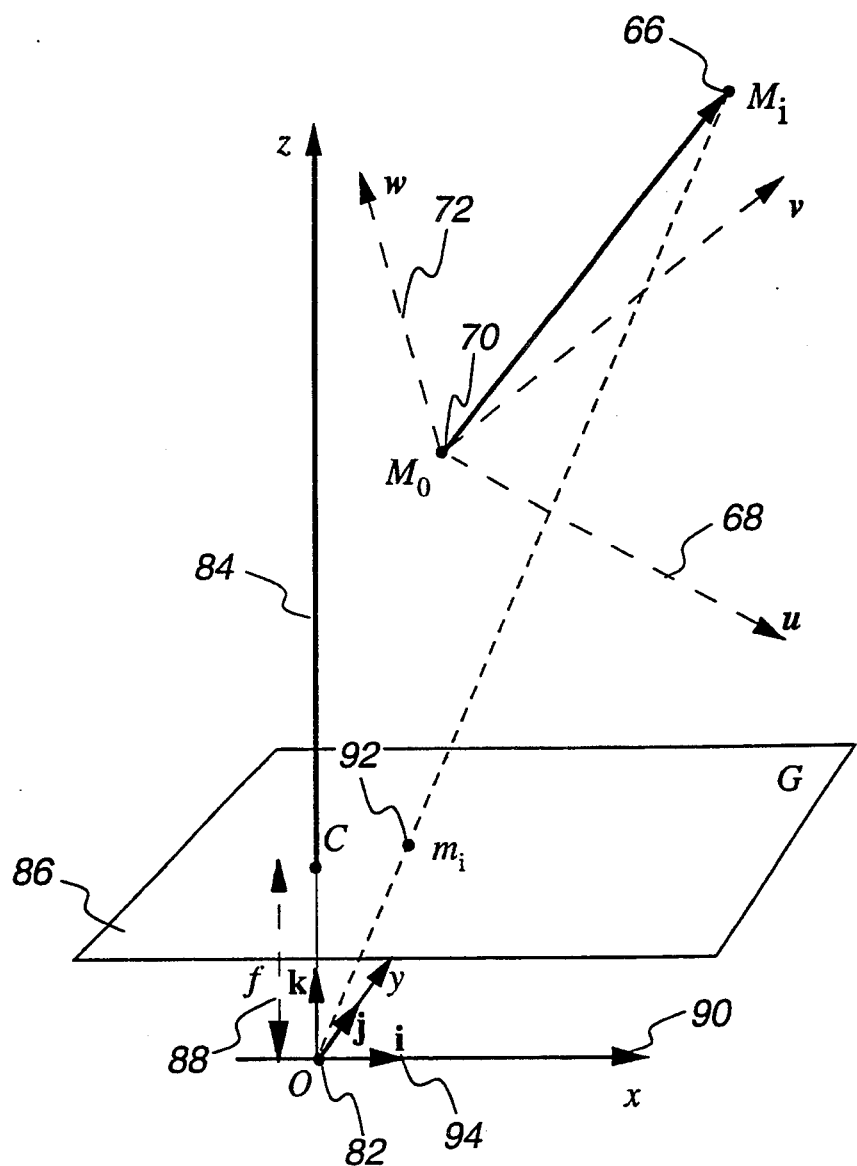

The drawing in FIG. 2 shows the geometric relationship between a feature point of an object and its images according to a true perspective projection onto the image plane of a camera.

Figure 3:
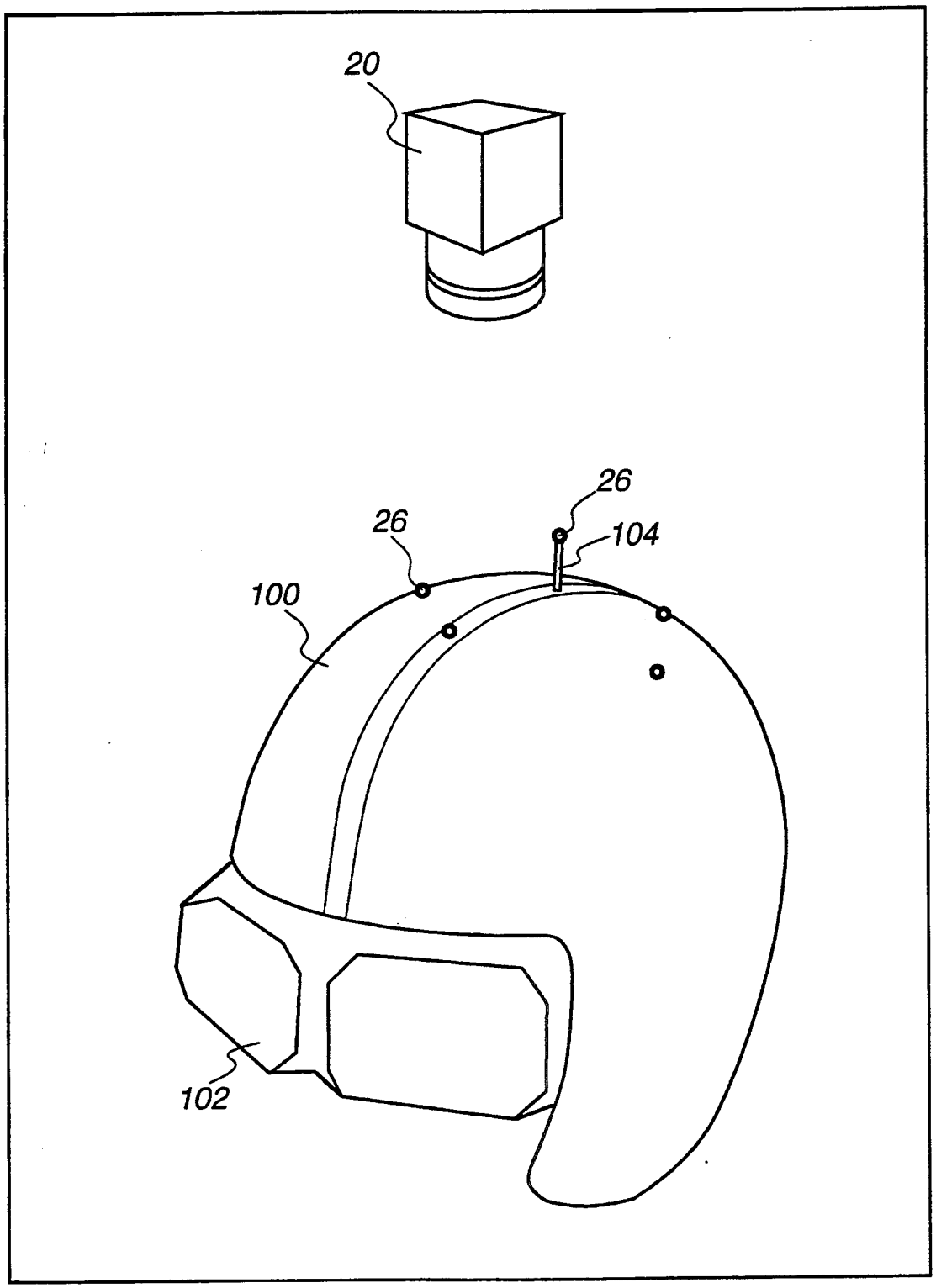

FIG. 3 is a view of a pose monitoring system applied to monitoring the position and orientation of the head of an operator.

REFERENCE NUMERALS IN THE DRAWINGS

20 Video camera
22 Computer display
24 Computer
26 Light sources
28 Pointing device
30 Light guide
32 Main light source
34 Handle
36 Frame
40 Operator's hand
44 Power cable
48 Video cable
50 Spot Detecting Unit
52 Data cable
60 Screen cursor
62 Cuboid peg
64 Block
66 Object points
68 Object coordinate system
70 Origin of object coordinate system
72 Unit vectors of object coordinate system
82 Camera nodal point
84 Camera optical axis
86 Camera image plane
88 Camera focal length
90 Camera coordinate system
92 Image points corresponding to object point
94 Unit vectors of camera coordinate system
100 Helmet
102 Head mounted displays (HMD)
104 Spacer

DESCRIPTION OF THE PREFERRED EMBODIMENTS

Figure 1:
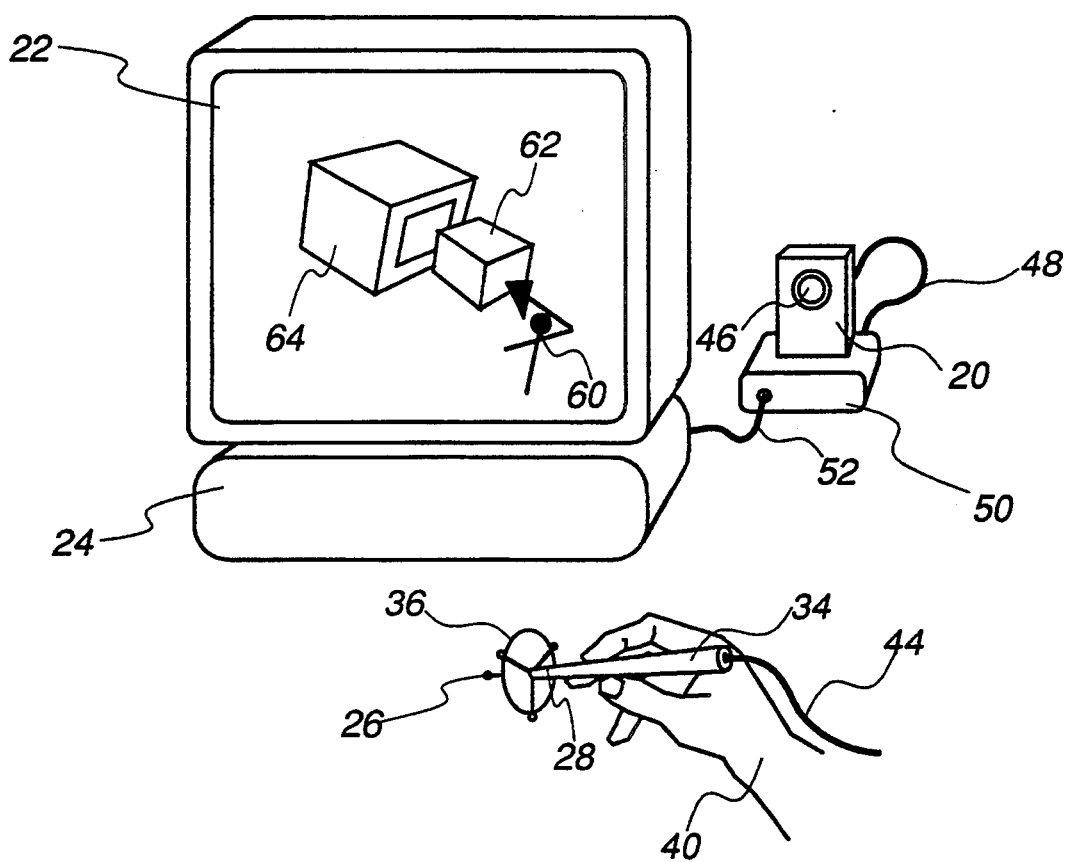
FIG. 1 is a schematic diagram of a system for monitoring the pose of a pointing device according to this invention.

FIG. 1 illustrates an embodiment of the system. Camera 20 is positioned next to computer display 22 of computer 24 and faces an operator. Several light sources 26 are attached to object 28 used as a pointing device by the operator. Light sources 26 may be constituted of very small incandescent light bulbs or light emitting diodes (LEDs). Electric power to pointing device 28 can be provided by batteries or by a power cable 44. Light sources 24 emit light principally in the infrared range instead of the visible light range and, concurrently, camera 20 may be designed to be more sensitive to infrared light than to visible light, so that the response of the camera array to the light sources is large in comparison to the response to background light, and so that the spots created by the light sources in the image are much brighter than the background even when the operator works in ambient light.

A video cable 48 transmits the video signal from the camera to a Spot Center Detecting Unit 50, which analyzes the camera images coded in the video signal and detects the image coordinates of the centers of the bright spots created by the light sources. These coordinates are transmitted by data cable 52 to main computer 24, where the iterative computation of the position and orientation (the "pose") of pointing device 28 repeatedly takes place at small time intervals. Alternatively, this iterative computation could have taken place inside a separate microprocessor in a box outside the main computer, in which case the parameters describing the pose of the pointing device would be transmitted to main computer 24 through data cable 52. This iterative computation is described in another section below in reference to FIG. 2. A screen cursor 60 is shown on the computer display among perspective views of 3D objects, a cuboid peg 62 and a block 64. Screen cursor 60 is the perspective projection of a virtual 3D cursor of known 3D structure that is assumed to move along pointing device 28. In the illustration of FIG. 1, the virtual 3D cursor is a stick figure of a man with a spherical head, holding in his right hand an arrow that is perpendicular to the plane of his body and points in front of him. Screen cursor 60 is obtained from the virtual 3D cursor by the same perspective projection that is used for the other 3D objects of the virtual 3D scene represented on the computer display. In the drawing, the operator has attached the cursor to cuboid peg 62, and is inserting this peg into the rectangular hole of block 64.

The drawing of FIG. 2 is used to explain the theoretical bases on which the task of computing the pose of device 28 is based. In the following explanations of these theoretical bases, bold characters are used for denoting vectors and matrices.

The notations for the object are shown on FIG. 2. A point 66 of device 28 that is visible and easily detected in the camera image is called $M_i$. When light sources are used as in FIG. 1, such a point is the center of one of the light sources 26. A single point with index i is shown for illustration purposes, but the method described in the following text applies when at least four noncoplanar points $M_1$, $M_2$, $M_3$, $M_4$, and as many noncoplanar points as is wished, are visible on the object. Therefore $M_i$ stands for any of these points. The relative positions of these points in the object are assumed to be known, and are defined by their coordinates in a cartesian coordinate system 68 fixed to the object. Origin 70 of coordinate system 68 is taken to be a point $M_0$ which will be called the reference point of the object. Note that the method does NOT require that the image of the reference point be found in the camera image of the object. Therefore, point $M_0$ is not generally located at the center of a light source. The axes of object coordinate system 68 are called $M_0u$, $M_0v$ and $M_0w$. Unit vectors 72 of this coordinate system are called u, v, and w.

The coordinates of $M_0$ in object coordinate 62 system are (0, 0, 0). In the object coordinate system the vector $M_0M_i$ has coordinates $U_i$, $V_i$, and $W_i$, written ($U_i$, $V_i$, $W_i$) in the following text. Clearly, these coordinates are known, since the geometric arrangement of points such as $M_i$ in the object coordinate system is known.

The notations for the geometric construction used for modelling the image formation process in the camera are also shown in FIG. 2. This image formation process is modelled using the pinhole camera model, a reasonable assumption widely used in the field of computer vision. For details, see for example the book "Computer Vision", by Ballard and Brown, Prentice-Hall. With this model, the imaging process is simply a central projection in which the center of projection is the nodal point 82 of the camera, and the projection plane is the image plane 86 of the camera. This central projection is also called perspective projection. In FIG. 2, center of projection 82 is labelled O, and image plane 86 is labelled G. For simplicity, image plane 86 is drawn on the same side of the center of projection O as points 66 of object 28, whereas in an actual camera the image plane is on the other side of the center of projection, with the result that the image is inverted. Here the image consists of the central projections of points 66 of the object on image plane G. For example, image point $m_i$ in image plane G of a point $M_i$ in front of the camera is constructed by taking the intersection 92 of a ray from point $M_i$ to center of projection O with image plane G, as shown in FIG. 2. Coordinate system 90 of camera 20 is centered in O, and has axes Ox and Oy parallel to the image plane G and axis Oz perpendicular to the image plane G. Optical axis 84 of camera 20 is axis Oz. Focal length 88 of camera 20 is called f. It is the z-coordinate of image plane G. Unit vectors 94 of camera coordinate system 90 are i for the axis Ox, j for axis Oy, and k for axis Oz. The position of image point $m_i$ in image plane G is described by its coordinates $x_i$ and $y_i$ in camera coordinate system 90.

The information which is available for finding the unknown object pose is the following: As previously explained, the coordinates of object points $M_1$, $M_2$, $M_i$, etc., in the coordinate system of the object are known by preliminary measurements. The coordinates $(x_1, y_1)$, $(x_2, y_2)$, $(x_i, y_i)$, etc. of image points $m_1$, $m_2$, $m_i$, etc., are given by the analysis of the video signal in Spot Detecting Unit 50 shown in FIG. 1. Furthermore an image point such as $m_1$ is known to be the image of object point $M_1$ and no other point, similarly for $m_2$ and $M_2$, $m_i$ and $M_i$, etc.

From this information, the goal is to compute the rotation matrix R and translation vector T of the object in the camera coordinate system. The rotation matrix R and translation vector T can be grouped into a single 4×4 transformation matrix which will be called the pose matrix P in the following text:

$$P = \begin{bmatrix} i_u & i_v & i_w & T_x \\ j_u & j_v & j_w & T_y \\ k_u & k_v & k_w & T_z \\ 0 & 0 & 0 & 1 \end{bmatrix}$$

To obtain the coordinates of an object point $M_i$ in the camera coordinate system using this pose matrix P instead of the more traditional rotation matrix and translation vector, one would simply multiply this matrix P by the coordinates of $M_i$ (or equivalently, a vector $M_0M_i$) in the object coordinate system. This operation requires that point $M_i$ or vector $M_0M_i$ be added a fourth coordinate (a fourth dimension) equal to 1 (one). The 4 coordinates are said to be the homogeneous coordinates of the point or vector. For a reference text explaining these concepts in more details, see for example "Computer Graphics Principles and Practice", by Foley, van Dam, Feiner and Hughes, Addison-Wesley, 1990. In the following, we keep the same notations $M_i$ and $M_0M_i$ to denote points and vectors in homogeneous coordinates.

The first line of the matrix P is a row vector that we call $P_1$. The other row vectors are called $P_2$, $P_3$ and $P_4$. In the first row vector, $P_1$, the coordinates $i_u$, $i_v$, $i_w$ are the coordinates of a 3D vector, i, which is the first row of the rotation matrix R of the transformation. The fourth coordinate, $T_x$, is the x-coordinate of the translation vector T. It is well known, but important to remember, that vector i is also the unit vector for the x-axis of the camera coordinate system expressed in the object coordinate system ($M_0u$, $M_0v$, $M_0w$). Similarly, in the second row vector, $P_2$, the coordinates $j_u$, $j_v$, $j_w$ are the coordinates of a vector j which is the second row vector of the rotation matrix. The vector j is also the unit vector for the y-axis of the camera coordinate system, expressed in the object coordinate system ($M_0u$, $M_0v$, $M_0w$). In the third row vector, $P_3$, the coordinates $k_u$, $k_v$, $k_w$ are the coordinates of a vector k which can be found as the cross product of the 2 vectors i and j.

Therefore once the first two row vectors $P_1$ and $P_2$ and the coordinate $T_z$ have been computed, the object pose matrix P can easily be completed. Consequently, the following explanations focus on computing $P_1$ and $P_2$ and the coordinate $T_z$. One can also notice from these remarks the structure of the pose matrix P, with the 3×3 rotation matrix in the top left position, the translation vector with a 1 (one) as fourth coordinate in the fourth column, and zeros to complete the fourth row.

The fundamental relation which relates $P_1$, $P_2$, the coordinates of the object vectors $M_0M_i$ in the object coordinate system, and the coordinates $x_i$ and $y_i$ of the perspective images $m_i$ of $M_i$ is $$M_0M_i \cdot Q_1 = x'_i,$$

$$M_0M_i \cdot Q_2 = y'_i,$$

with $$Q_1 = (f/T_z)P_1,$$

$$Q_2 = (f/T_z)P_2,$$

$$x'_i = x_i(1 + \epsilon_i),$$

$$y'_i = y_i(1 + \epsilon_i),$$

and $$\epsilon_i = M_0M_i \cdot P_3/T_z - 1$$

It is useful to introduce the unknown coordinates ($X_i$, $Y_i$, $Z_i$) of vector $M_0M_i$ in the camera coordinate system for the sole purpose of demonstrating that these equations are correct. We remember that the dot product $M_0M_i.P_1$ is the operation performed when multiplying the first row of the transformation matrix P with the coordinates of an object point in the object frame of reference to obtain the x-coordinate $X_i$ of $M_i$ in the camera coordinate system. Thus $M_0M_i.P_1=X_i$. For the same reason, the dot product $M_0M_i.P_3$ is equal to $Z_i$, thus $(1+\epsilon_i)=Z_i/T_z$. Also, in perspective projection, the relation $x_i=fX_i/Z_i$ holds between image point coordinates and object point coordinates in the camera coordinate system. Using these expressions in the equations above leads to identifies, which proves the validity of the above equations.

When the terms $\epsilon_i$ are known in the above equations, the unknowns $Q_1$ and $Q_2$ are easily computed by solving linear systems. Details about this step are provided in the text below. Once $Q_1$ and $Q_2$ have been computed, $P_1$, $P_2$ and $T_z$ can be computed by noting that the first three coordinates of $P_1$ and $P_2$ are the coordinates of the unit vectors i and j in the object coordinate system. Let the vector $R_1$ be the vector defined by the first three coordinates of $Q_1$, $R_1=(Q_{11}, Q_{12}, Q_{13})$. Similarly, $R_2$ is defined by the first three coordinates $Q_2$, $R_2=(Q_{21}, Q_{22}, Q_{23})$. The definitions for $Q_1$ and $Q_2$, $Q_1=(f/T_z)P_1$, $Q_2=(f/T_z)P_2$, translate to $R_1=(f/T_z)i$, $R_2=(f/T_z)j$, when only the first three coordinates are considered. Since i and j are unit vectors, $(f/T_z)$ must be equal to the norm of $R_1$ or $R_2$, and can be computed from either of these norms. Once $(f/T_z)$ is computed, the vectors i and j can be computed; then the vector k is equal to the cross product i×j. This lets us compute $P_3$ which has coordinates $(k_u, k_v, k_w, T_z)$ as seen above. At this point a better approximations for the $\epsilon_i$ terms can be computed by using $\epsilon_i=M_0M_i.P_3/T_z-1$.

Therefore, we can find the pose of an object by first guessing a good value for the $\epsilon_i$ terms or simply assuming that the $\epsilon_i$ are equal to zero if no information is available. Notice from the expression of $\epsilon_i$ that these terms represent the projections of the vectors $M_0M_i$ on the camera optical axis, divided by the distance $T_z$ from the object to the camera along the camera optical axis. Therefore the $\epsilon_i$ are generally small, and assuming that they are equal to zero is generally an acceptable guess. Then we can compute approximate evaluations for $P_1$, $P_2$ and $T_z$. This knowledge in turn allows us to compute better values for the $\epsilon_i$. We can repeat the process. Experiments show that this iterative approach converges to values of $P_1$, $P_2$ and $T_z$ which correspond to the correct pose of the object in a few iteration steps, as long as the points $M_i$ are contained within a camera field of view of less than 90 degrees.

The resulting iterative pose algorithm can be summarized as follows:

1. $\epsilon_i =$ best guess, or $\epsilon_i = 0$ if no pose information is available 2. Start of loop: Solve for $Q_1$ and $Q_2$ in the following systems $$M_0M_i \cdot Q_1 = x'_i, M_0M_i \cdot Q_2 = y'_i,$$

with $$x'_i = x_i(1 + \epsilon_i), y'_i = y_i(1 + \epsilon_i)$$

3. From $Q_1$, get $$R_1 = (Q_{11}, Q_{12}, Q_{13}),$$

$$f/T_z = |R_1|,$$

$$i = (T_z/f)R_1,$$

$$P_1 = (T_z/f)Q_1.$$

Similar operations yield j and $P_2$ from $Q_2$.

4. $k = i \times j$, $P_3 = (k_u, k_v, k_w, T_z)$, $\epsilon_i = (1/T_z)M_0M_i \cdot P_3 - 1$ 5. If all $\epsilon_i$ are close enough to $\epsilon_i$ at previous loop, EXIT, else go to step 2

6. $P_1$, $P_2$, $P_3$, and $P_4 = (0, 0, 0, 1)$, are the 4 rows of the pose matrix.

We now provide details on finding $Q_1$ and $Q_2$ by solving the systems of equations found in step 2 of the iterative algorithm. For example the equations for $Q_1$ are:

$$M_0M_i.Q_1 = x'_i, \text{ with } x'_i = x_i(1+\epsilon_i).$$

The unknowns are the 4 coordinates ($Q_{11}$, $Q_{12}$, $Q_{13}$, $Q_{14}$), of $Q_1$, and we can write one equation with each of the object points $M_i$ for which we know the position $m_i$ of the image and its image coordinate $x_i$. One such equation has the form $U_iQ_{11}+V_iQ_{12}+W_iQ_{13}+Q_{14}=x'_i$, where ($U_i$, $V_i$, $W_i$, 1) are the 4 coordinates of $M_i$ and ($Q_{11}$, $Q_{12}$, $Q_{13}$, $Q_{14}$) are the 4 coordinates of $Q_1$. If we write equations for several object points $M_i$, we obtain a linear system of equations which can be written in matrix form A $Q_1=I_x$, where A is a matrix with i-th row vector $A_i=(U_i, V_i, W_i, 1)$, and $I_x$ is a column vector with i-th coordinate equal to $x'_i$.

Similarly the vector $Q_2$ can by found by solving the linear system A $Q_2=I_y$, where A is the same matrix, and $I_y$ is a column vector with i-th coordinate equal to $Y'_i$.

Since there are 4 unknown coordinates in vectors $Q_1$ and $Q_2$, the matrix A must have at least rank 4 for the systems to provide solutions. This requirement is satisfied if the matrix has at least 4 rows and the object points are noncoplanar; therefore at least 4 noncoplanar object points and their corresponding image points are required. To solve for $Q_1$ and $Q_2$ in these systems, the well-known pseudo-inversion operation is applied to matrix A (see for example the Appendix in the book "Robot Vision" by B. K. P. Horn, MIT Press, for details on solving overdetermined linear systems by pseudo-inversion of matrices). The pseudo-inverse of matrix A is called the object matrix B in this disclosure. Since matrix A is defined in terms of the known coordinates of the object points in the object coordinate system, the object matrix B only depends on the relative geometry of the object points and can be precomputed. For only 4 noncoplanar object points, matrix A is an invertible square matrix and the matrix B is simply the inverse of A. This completes the general description of the iterative algorithm which accurately computes the pose of an object such as pointing device 28 of FIG. 1 when the relative geometry of points in the object and the positions of their images are known.

In FIG. 3, another embodiment of the pose monitoring system is illustrated, in which the position and orientation in space of the head of an operator is monitored. Light sources 26 are mounted on the top surface of helmet 100. Some of the light sources may be mounted a few centimeters away from the surface of the helmet by means of spacers 104, because configurations of light sources very distinct from a coplanar arrangement provide a more precise pose computation. Camera 20 mounted above operator's helmet 100 captures the images of the light sources. With judicious camera placement, the risk of the light sources being occluded from camera view by the helmet is small, because the ranges of the operator's head motions in tilt and roll are anatomically limited. Applications include aircraft flight simulators and other virtual reality applications. From the pose computed by the system for the head of the operator, the correct field of view and perspective projection of a virtual scene are computed and projected in head mounted displays 102 in front of the eyes of the operator.

Many other domains of technology can benefit from the fast and inexpensive remote detection of the motions of objects or humans by the computer vision techniques allowed by this invention. Therefore, although the description above contains many specificities, these should not be construed as limiting the scope of this invention but as merely providing illustrations of some of the presently preferred embodiments of this invention.

Thus the scope of this invention should be determined by the appended claims and their legal equivalents, rather than by the examples given.

I claim:

1. A sensing system for producing at successive time instants digital signals expressing positions and orientations of a three dimensional (3-D) object defined by a translation vector and a rotation matrix grouped into a pose matrix that in turn effects changes in a peripheral device comprising:

a single electronic camera having an image plane, an optical axis, a center of projection, a focal length, and a camera reference coordinate frame being centered at the center of projection with x and y axes parallel to the image plane, and a z-axis parallel to the optical axis, the single electronic camera producing an analog video signal;

at least four noncoplanar light sources rigidly attached to the 3-D object, the light sources having light source coordinates in an object reference coordinate frame of the 3-D object, the light sources projecting bright spots onto the image plane of the camera;

means for processing the analog video signal and determining a list of bright spot locations in the camera reference coordinate frame;

a computing means that includes memory means, processing means and output means;

the memory means storing a pseudo-inverse matrix B of a matrix A, wherein each row of the matrix A consists of four homogeneous coordinates of each of the light sources in a coordinate frame of reference of the object;

the memory means also storing a list of x-coordinates and a list of y-coordinates of the bright spots in the image plane of the camera;

the memory means also storing a list of correction factors to be applied to the list of x-coordinates and the list of y-coordinates, the list of correction factors depending on the position and orientation of the object, each element of the list of correction factors being initially set to zero if no knowledge about the position and orientation of the object is available, and being initially estimated otherwise;

the memory means also containing an iterative pose computing task for accurately computing the position and orientation of the object in the reference coordinate frame of the camera;

the iterative pose computing task comprising subtasks of:

(a) applying the correction factors to the list of x-coordinates to obtain a corrected list of x-coordinates and to the list of y coordinates to obtain a corrected list of y-coordinates, (b) multiplying the matrix B by the corrected list of x-coordinates and by the corrected list of y-coordinates to obtain a vector $Q_1$ and a vector $Q_2$, (c) finding a norm $N_1$ of a vector $R_1$ whose three coordinates are first three coordinates of vector $Q_1$, and a norm $N_2$ of a vector $R_2$ whose three coordinates are first three coordinates of vector $Q_2$, (d) dividing vector $Q_1$ by $N_1$ to obtain a first row of the pose matrix of the object and vector $Q_2$ by $N_2$ to obtain a second row of the pose matrix of the object, (e) computing a vector k as a cross-product of two vectors respectively defined by first three elements of the first row of the pose matrix and by first three elements of the second row of the pose matrix, (f) dividing the norm $N_1$ by the focal length of the camera to obtain an inverse of a coordinate $T_z$ of the translation vector of the object along the optical axis of the camera, (g) complementing the vector k with a fourth coordinate equal to the coordinate $T_z$ of the translation vector to obtain a third row of the pose matrix of the object, (h) completing the pose matrix with a fourth row containing elements 0, 0, 0, and 1, and (i) computing a new list of correction factors as a vector obtained by multiplying the matrix A by the third row of the pose matrix, dividing each coordinate by $T_z$, and subtracting 1 from each coordinate;

and repeatedly using the iterative pose computing task by repeating the steps (a)–(i) until the new list of correction factors is equal to a previous list of the correction factors whereby for each new image of the camera, the iterative pose computing task produces a pose matrix of the object after a few iterations of the pose computing task; and providing to the output means for each frame of the video signal three coordinates of the translation vector of the 3D object and nine elements of the rotation matrix of the 3-D object in digital form which is the computed pose matrix to effect changes in the peripheral device.

2. The apparatus of claim 1, wherein the light sources are secondary light sources composed of reflective elements which reflect light from at least one primary light source.

3. The apparatus of claim 1, further comprising coupling means between the 3-D object and a body part of an operator, whereby the motions of the body part of the operator are transmitted to the object and are monitored by monitoring the motion of the object.

4. The apparatus of claim 3, wherein the coupling means comprise a handle attached to the object and held by the operator.

5. The apparatus of claim 3, wherein the coupling means comprise means to attach the object to a head of the operator.

6. The apparatus of claim 3, wherein the peripheral device is a display means and further comprising:
lists of numbers stored in the memory means and describing a three dimensional (3-D) structure to be displayed on the display means;
a perspective projection task stored in the memory means; and
the perspective projection task repeatedly using the pose matrix to project on the display means a perspective projection of the 3-D structure.

7. The apparatus of claim 6, wherein the 3D structure is a 3D cursor, whereby the perspective projection of the 3D cursor is shown on the display means and interactively emulates a position and orientation of the body part of the operator.

8. The apparatus of claim 6, wherein the 3D structure is a 3D scene, whereby the perspective projection of the 3D scene is displayed on the display means in front of the eyes of the operator from a point of view which is interactively modified by the motions of the body part of the operator.

9. An apparatus for three-dimensional (3-D) cursor control by an operator comprising:
a plurality of light sources at least four in number configured in any noncoplanar arrangement;
handle means for allowing an operator to hold and move the plurality of noncoplanar light sources freely in space;
a single electronic camera having an image plane, a center of projection and an optical axis, the single electronic camera producing an analog video signal;
processing means for processing the analog video signal and determining a list of positions of image projections of the light sources onto the image plane in a reference coordinate frame of the single electronic camera, the reference coordinate frame of the single electronic camera being centered at the single electronic camera's center of projection with x and y axes parallel to the image plane, a z-axis parallel to the single electronic camera's optical axis;
a computing means for repeatedly combining the list of positions of image projections of the light sources with coordinates of the light sources in a coordinate frame of reference of the plurality of noncoplanar light sources,
the computing means including memory means, processing means and output means;
the memory means storing a pseudo-inverse matrix B of a matrix A, wherein each row of the matrix A consists of four homogeneous coordinates of each of the light sources in a coordinate frame of reference of the object;
the memory means also storing a list of x-coordinates and a list of y-coordinates of the bright spots in the image plane of the camera;
the memory means also storing a list of correction factors to be applied to the list of x-coordinates and the list of y-coordinates, the list of correction factors depending on the position and orientation of the object, each element of the list of correction factors being initially set to zero if no knowledge about the position and orientation of the object is available, and being initially estimated otherwise;
the memory means also containing an iterative pose computing task for accurately computing the position and orientation of the object in the reference coordinate frame of the camera;
the iterative pose computing task comprising subtasks of:
(a) applying the correction factors to the list of x-coordinates to obtain a corrected list of x-coordinates and to the list of y coordinates to obtain a corrected list of y-coordinates,
(b) multiplying the matrix B by the corrected list of x-coordinates and by the corrected list of y-coordinates to obtain a vector $Q_1$ and a vector $Q_2$,
(c) finding a norm $N_1$ of a vector $R_1$ whose three coordinates are first three coordinates of vector $Q_1$, and a norm $N_2$ of a vector $R_2$ whose three coordinates are first three coordinates of vector $Q_2$,
(d) dividing vector $Q_1$ by $N_1$ to obtain a first row of the pose matrix of the object and vector $Q_2$ by $N_2$ to obtain a second row of the pose matrix of the object,
(e) computing a vector k as a cross-product of two vectors respectively defined by first three elements of the first row of the pose matrix and by first three elements of the second row of the pose matrix,
(f) dividing the norm $N_1$ by the focal length of the camera to obtain an inverse of a coordinate $T_z$ of the translation vector of the object along the optical axis of the camera,
(g) complementing the vector k with a fourth coordinate equal to the coordinate $T_z$ of the translation vector to obtain a third row of the pose matrix of the object,
(h) completing the pose matrix with a fourth row containing elements 0, 0, 0, and 1, and
(i) computing a new list of correction factors as a vector obtained by multiplying the matrix A by the third row of the pose matrix, dividing each coordinate by $T_z$, and subtracting 1 from each coordinate;

and repeatedly using the iterative pose computing task by repeating the steps (a)–(i) until the new list of correction factors is equal to a previous list of the correction factors whereby for each new image of the camera, the iterative pose computing task produces a pose matrix of the object after a few iterations of the pose computing task; and repeatedly outputting onto a display means in front of the operator's eyes a perspective projection of a 3-D virtual cursor defined by the rotation matrix and the translation vector.

* * * * *